Feb. 16, 1965   R. H. McGREGOR   3,169,337
FISH LURE
Filed Aug. 28, 1963
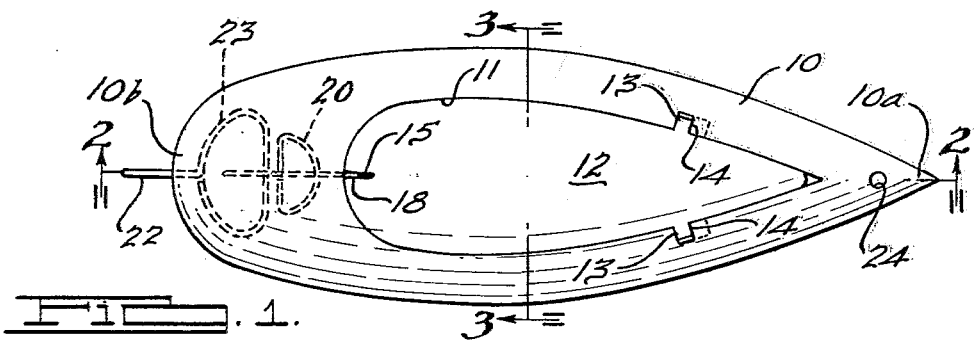
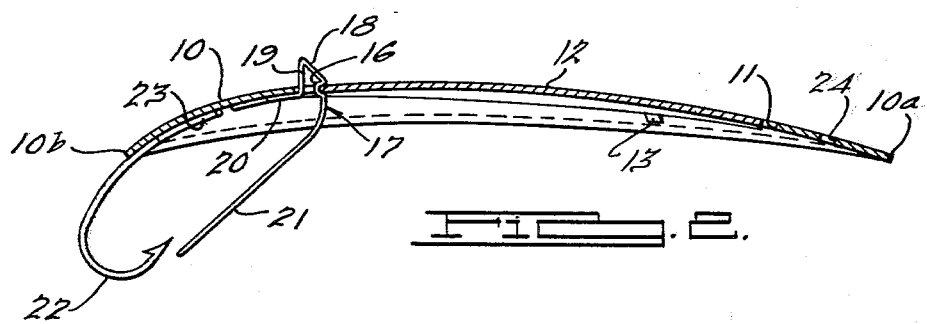
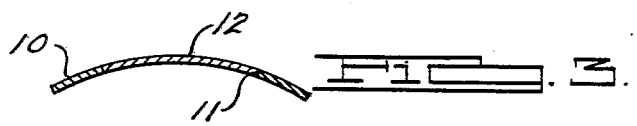
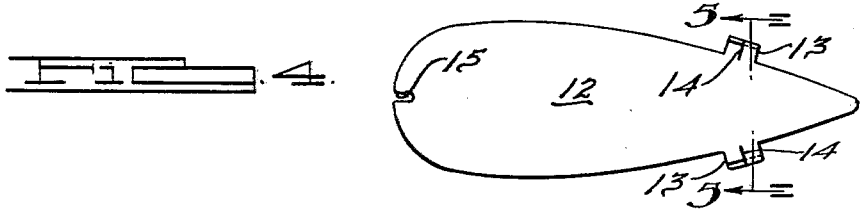
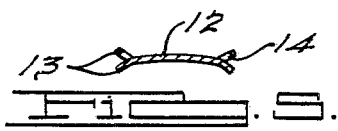
INVENTOR.
Ronald H. McGregor.
BY Jay C Taylor
ATTORNEY

United States Patent Office 3,169,337
Patented Feb. 16, 1965

3,169,337
FISH LURE
Ronald H. McGregor, 22636 Beach, Dearborn, Mich.
Filed Aug. 28, 1963, Ser. No. 305,088
5 Claims. (Cl. 43—42.09)

This invention relates to fish lures and in particular to a two part lure having a body and a replaceable insert removably secured to the body, whereby the body can be used alone or in combination with the insert as a lure.

Another object is to provide such a lure whereby the insert can be replaced with similar inserts of different colors or shapes.

Another and more specific object is to provide such a lure and improved means for releasably securing the insert to the lure, whereby the insert and body are provided with interfitting parts adapted to wedge tightly together upon movement of the insert in one direction relative to the body, and including a resilient weed guard secured to the body having a yieldable portion interlocking with an edge of the insert to yieldingly urge the latter in said direction, the insert in turn comprising means for holding the weed guard in proper position.

Still another object is to provide an improved spoon-type lure of the above character having a central replaceable portion adapted to be removed to leave a central orifice in the spoon.

Other objects of this invention will appear in the following description and appended claims, reference being had to the accompanying drawings forming a part of this specification wherein like reference characters designate corresponding parts in the several views.

FIGURE 1 is a plan view of a fish lure embodying the present invention.

FIGURE 2 is a longitudinal mid-sectional view taken in the direction of the arrows substantially along the line 2—2 of FIGURE 1.

FIGURE 3 is a transverse sectional view taken in the direction of the arrows substantially along the line 3—3 of FIGURE 1.

FIGURE 4 is a plan view of the insert removed from the body.

FIGURE 5 is a transverse sectional view taken in the direction of the arrows substantially along the line 5—5 of FIGURE 4.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, an embodiment of the present invention is illustrated by way of example in a spoon-shaped lure comprising a symmetrical upwardly dished body 10 converging to a pointed front end 10a and having a rounded trailing end 10b. Arranged symmetrically within the body 10 is a central hole or recess 11 for a replaceable upwardly dished spoon shaped insert 12. In the present instance both the hole 11 and insert 12 are shaped similarly to the body 10.

Near the leading end of the insert 12, the latter is provided with a pair of oppositely directed lateral tabs 13, each tab being split transversely of the axis of symmetry of the body 10 and the portions of each tab 13 at the opposite sides of the split 14 being bent upwardly and downwardly, respectively, to engage the juxtaposed inner edge of the body 10. By virtue of the forward convergence of the hole 11, the split tabs 13 will engage the body 10 in a wedge action upon relative forward movement of the insert 12 with respect to the body 10.

The rear end of the insert 12 is provided on its longitudinal axis with a notch 15 which interengages a mating notch 16 of a spring arm indicated generally at 17. Inclined rearwardly from the notch 16 is a short cam portion 18 of the spring arm 17 which recurves sharply at 19 to pass downwardly through the hole 11 and notch 15 to the underside of the body 10. The lower end of the upright extension 19 terminates in a loop 20 which conforms closely to the under surface of the body 10 and is suitably secured thereto, as for example by being brazed thereto.

Below the notch 16, the spring arm extends directly downwardly and then declines rearwardly to effect a weed guard 21 which terminates adjacent the forward edge of the barb of a conventional fishhook 22. The shank of the latter recurves upwardly and terminates in a loop 23 which also conforms closely to the contour of the underside of the body 10 and is suitably brazed thereto. The forward end of the body 10 is provided with a small opening 24 to facilitate attachment with a leader or fishline.

The spring arm 17 is under tension yieldingly urging the insert 12 forwardly to effect the wedge type engagement between the tabs 13 and body 10 as aforesaid. The insert 12 in turn provides a stop to limit forward swinging of the resilient arm 17, thereby to hold the weed guard 21 in proper relation with respect to the barb 22. In the assembled position the notch is spaced sufficiently forward from the upright stem 19 to enable the notch 16 and guard 21 to be sprung rearwardly out of engagement with the rear edge of insert 12 at the notch 15, whereupon the insert 12 may be readily slid upwardly and rearwardly along the cam portion 18 out of engagement with the body 10. The insert 12 and body 10 may be reassembled by a reverse operation.

It is apparent that the body 10 and insert 12 may be formed in other shapes and that a plurality of inserts 12 can be provided in different shapes and/or colors to enable a selection of a variety of assembled fish lures.

I claim:

1. In a fish lure, a body, an insert, a fishhook extending from one of the latter two members, and means removably securing said insert to said body comprising interfitting portions on said body and insert adjacent one end of the latter, said interfitting portions comprising relatively inclined elements adapted to wedge tightly together upon movement of said insert in the direction toward said one end with respect to said body, and a resilient weed guard secured to said body, said weed guard having a portion engaging an edge of said insert and being under spring tension yieldingly urging said insert in said one direction, said weed guard extending from said portion thereof and terminating adjacent the point of said fishhook to shield the same from weeds upon movement of said lure in a predetermined direction.

2. In a fish lure, a body having an orifice with forwardly converging sides, a fishhook secured to said body, an insert adapted to fit within said orifice, and means for removably securing said insert to said body within said orifice comprising interfitting portions on said body and insert adjacent the forward end of the latter, said interfitting portions comprising wedge means formed on opposite sides of said insert and engaging said forwardly converging sides of said orifice to wedge tightly therewith upon movement of said insert in the direction toward said forward end with respect to said body, and a resilient weed guard secured to said body and extending therefrom to cooperate with said fishhook, said weed guard having a notched portion receiving the rear edge of said insert therein and being under spring tension yieldingly urging said insert in said direction.

3. In a fish lure, a body member having an orifice with sides converging toward one end of said body member, an insert member adapted to fit within said orifice and having converging sides mating with the converging sides of said orifice, and means for removably securing said insert member to said body member within said orifice comprising interfitting portions on said members adjacent said one end thereof at each of the converging sides of said orifice, said interfitting portions at each side comprising a pair of oppositely inclined tabs extending from the inclined side of one of said members and receiving therebetween the mating inclined side of the other of said members in a wedge action upon movement of said insert member in the direction toward said one end with respect to said body member, and resilient means on said body member engageable with said insert member adjacent the other end thereof yieldingly urging said insert member in said direction.

4. In a fish lure, a spoon-shaped body having a central orifice, a fishhook carried by said body and terminating in a pointed barb, a spoon-shaped insert, and means for removably securing said insert to said body within said orifice comprising interfitting portions on said body and insert adjacent one end of the latter, said interfitting portions comprising relatively inclined elements adapted to wedge tightly together upon movement of said insert in the direction toward said one end with respect to said body, and resilient means secured at one end thereof to said body adjacent the end of said insert opposite the latter's one end, said resilient means extending from said body, then recurving in a reverse bend inclined toward the insert, then inclining from said insert in a direction opposite to the direction of inclination of said reverse bend and terminating adjacent said barb to comprise a resilient weed guard for said hook, said reverse bend having a notch therein adapted to receive an edge of said insert therein and being under tension urging said insert in said direction.

5. In a fish lure, a body member having an orifice, an insert member adapted to fit within said orifice, a fishhook secured to one of said members, and means for removably securing said insert member to said body member within said orifice comprising interfitting portions on said members adjacent one end thereof, said interfitting portions comprising relatively inclined elements adapted to wedge tightly together upon movement of said insert member in the direction toward said one end with respect to said body member, and a resilient weed guard cooperable with said fishhook and secured to said body member, said weed guard having a notched portion receiving an edge of said insert member therein and being under spring tension yieldingly urging said insert member in said direction.

References Cited by the Examiner

UNITED STATES PATENTS 1,243,239　10/17　Albrechtsen.
2,738,612　3/56　French _____ 43—42.42 XR

FOREIGN PATENTS 111,724　9/44　Sweden.

ABRAHAM G. STONE, *Primary Examiner*.